(12) United States Patent
Kelly

(10) Patent No.: US 11,513,831 B2
(45) Date of Patent: Nov. 29, 2022

(54) SYSTEMS AND METHODS FOR VIRTUAL DESKTOP USER PLACEMENT IN A MULTI-CLOUD ENVIRONMENT

(71) Applicant: DELL PRODUCTS L.P., Round Rock, TX (US)

(72) Inventor: John Kelly, Mallow (IE)

(73) Assignee: DELL PRODUCTS L.P., Round Rock, TX (US)

( * ) Notice: Subject to any disclaimer, the term of this patent is extended or adjusted under 35 U.S.C. 154(b) by 9 days.

(21) Appl. No.: 16/867,508

(22) Filed: May 5, 2020

(65) Prior Publication Data

US 2021/0349745 A1 Nov. 11, 2021

(51) Int. Cl.
| | |
|---|---|
| *G06F 9/455* | (2018.01) |
| *G06F 9/50* | (2006.01) |
| *G06F 11/30* | (2006.01) |
| *G06F 8/61* | (2018.01) |
| *H04L 43/0852* | (2022.01) |

(52) U.S. Cl.
CPC ............ *G06F 9/45558* (2013.01); *G06F 8/63* (2013.01); *G06F 9/5072* (2013.01); *G06F 11/301* (2013.01); *G06F 11/3006* (2013.01); *H04L 43/0852* (2013.01); *G06F 2009/45562* (2013.01); *G06F 2009/45595* (2013.01)

(58) Field of Classification Search
CPC ............... G06F 9/45558; G06F 9/5072; G06F 11/3006; G06F 11/301; G06F 8/63; G06F 2009/45562; G06F 2009/45595; H04L 43/0852
See application file for complete search history.

(56) References Cited

U.S. PATENT DOCUMENTS

| | | | |
|---|---|---|---|
| 2018/0295033 A1* | 10/2018 | Vladimirskiy | ...... H04L 41/0895 |
| 2019/0303608 A1* | 10/2019 | Cohen | ...................... G06N 3/08 |
| 2020/0241894 A1* | 7/2020 | Li | ........................ G06F 9/45558 |
| 2020/0244766 A1* | 7/2020 | Farkas | ................ H04L 67/1008 |
| 2020/0327034 A1* | 10/2020 | Chellappan | ......... G06F 11/3466 |
| 2022/0269417 A1* | 8/2022 | Sanvido | ............. G06F 12/0292 |

* cited by examiner

*Primary Examiner* — Sisley N Kim
(74) *Attorney, Agent, or Firm* — North Weber & Baugh LLP

(57) ABSTRACT

Embodiments herein provide an analytics-based solution for recommending for the initial placement of one or more virtual desktop (VD) users in a multi-cloud environment and/or for the subsequent migration of one or more users in a multi-cloud environment. In one or more embodiments, a placement (initial or migratory) recommendation may be based one or more metrics related to the cloud deployment and user conditions/requirements. In one or more embodiments, a placement recommendation is based on assessing functionality requirements of a user or users and a correlation analysis with other functionality or functionalities as it relates to functionality that is available at specific cloud deployments. In one or more embodiments, the recommendation may alternatively or additionally be based upon latency analytics, in which end-to-end latency from the user to an application or applications may be considered as metric(s) in the recommendation determination.

21 Claims, 6 Drawing Sheets

SYSTEMS AND METHODS FOR VIRTUAL DESKTOP USER PLACEMENT IN A MULTI-CLOUD ENVIRONMENT

BACKGROUND

The present disclosure relates generally to information handling systems. More particularly, the present disclosure relates to virtual desktops.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Multi-cloud environments are increasingly becoming more pervasive as organizations seek to utilize the varying cost, security, and functionality profiles of different cloud models and locations. Virtual desktop (VD) environments are an example of a workload where the multi-cloud paradigm is being strongly adopted.

For example, organizations may decide to locate their main userbase in an on-premises or private cloud environment, and then may locate additional users or burst users (i.e., an increased set of users) in a public cloud environment. Such configuration may have a number of benefits. One benefit is that the core userbase is located on infrastructure that can be tightly controlled by the organization, whether it is security, usage, bandwidth, user rights, etc. Another benefit relates to the location of additional users, who may be highly transient and may only need an account for a brief period, on a public cloud environment. Typically, public cloud usage can be obtained and cancelled on-demand; thus, the organization can utilize such resources only when needed and thereby avoids purchasing equipment that is only temporarily used.

It should also be noted that an organization may have more than one private cloud environment. For example, as part of the growth of an organization it may develop with different private cloud networks as a result of design, geographic constraints, or other factors.

Given that an organization may have a multi-cloud system (whether different private clouds, public clouds, or both), organizational information technology (IT) staff may need to decide in which cloud to locate a particular user or users. Each user placement is a non-trivial decision since typically each location will have a specific technical profile and a specific cost profile. This decision become more complex as the functionality of clouds may not be identical. For example, certain clouds may support functionality that is not available in one or more other cloud environments and vice versa.

Given the cloud-specific, organization-specific, and user-specific nature the decision related to placement of a virtual desktop for a user, currently the decision has typically resulted in intuitive/instinctive or ad-hoc positioning of users in specific locations by IT personnel. However, like all such manual, non-analytic processes, they can be quite error prone.

Accordingly, it is highly desirable to find new, more rigorous and analytic ways to determine where to locate a virtual desktop for a user or users.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF EMBODIMENTS

Figure 1:
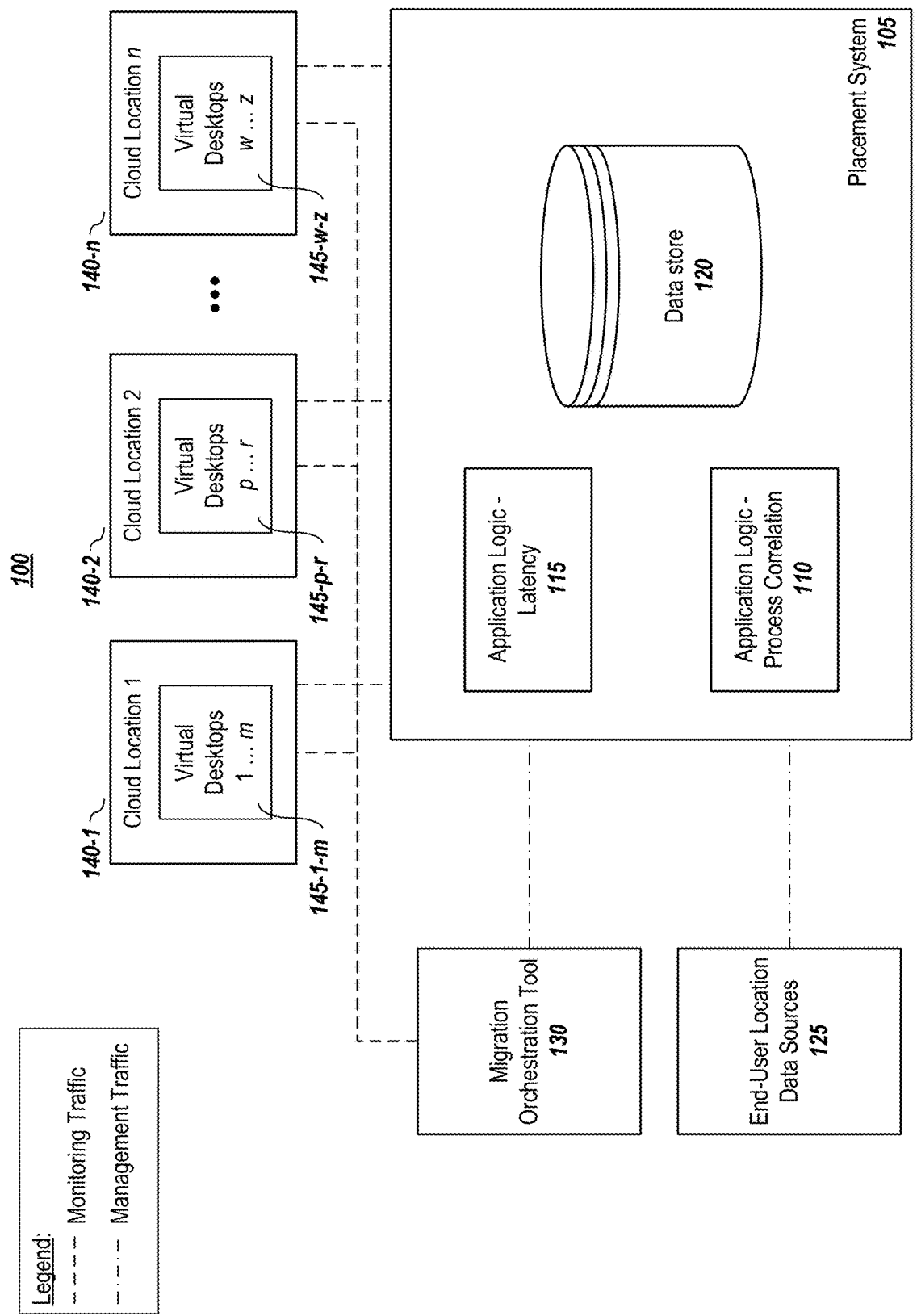
FIG. 1 ("FIG. 1") depicts an architectural representation of a system related to virtual desktop user placement in a multi-cloud environment, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one embodiment," "one or more embodiments," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state. A set may comprise one or more members.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of virtual desktops, aspects of the present disclosure are not so limited. Accordingly, the aspects of the present disclosure may be applied or adapted for use in other contexts.

A. General Introduction

Given that an organization may operate in a multi-cloud environment (whether different private clouds, public clouds, or both), placement of different users' virtual desktop within the various clouds has proven to be a very challenging task for IT professionals. Each user placement is a non-trivial decision because each location has a specific technical profile and a specific cost profile and because users may be different usage and technical requirements. This decision becomes more complex because certain clouds may support different functionalities. Accordingly, presented here are embodiments for analytics-based systems and methods for placement (whether initial placement or subsequent migration) of users' virtual desktop instances in a multi-cloud environment.

In one or more embodiments, the systems and methods presented in this patent document may use different criterion or criteria to determine an optimal or acceptable location for a virtual desktop (VD) user. In one or more embodiments, a criterion may be based upon correlation between specific desktop processes and the usage of specific elements of functionality that are available in one cloud location but not another. In one or more embodiments, a criterion may be based upon latency. It should be noted that in the discussion below, "placement" refers to the placement of a virtual desktop user in a cloud that is part of a multi-cloud environment, which placement may be the initial placement or may be placement as part of a "migration," which refers to the subsequent placement between clouds in a multi-cloud environment.

FIG. 1 depicts an architectural representation of a system related to a user's virtual desktop instance placement in a multi-cloud environment, according to embodiments of the present disclosure. As illustrated in FIG. 1, the system 100 comprises a placement system 105, a plurality of cloud locations 140, in which each cloud location includes a number of virtual desktop instances 145, end-user location data sources 125, and migration orchestration tools 130.

In one or more embodiments, the end-user location data sources 125 provide information in relation to the specific cloud location of each virtual desktop in the multi-cloud environment. Examples of components which can provide this information include such services as Active Directory, Virtual Desktop Infrastructure (VDI) management tools, calls to system utilities such as Microsoft PowerShell and the like. For example, VDI Connection Brokers are used to create a virtual desktop instances, in which an administrator can use a VDI to segment one or more servers into virtual desktops; these tools contain location in relation to which cloud a VD resides as part of their management tool database. Users can remotely access their respective virtual desktops, which are typically hosted on Virtual Machines (VM) that are controlled through management software.

In one or more embodiments, the migration orchestration tools 130 are responsible for issuing instructions for various tasks such as being responsible for issuing instructions to the various cloud locations to migrate users. The tools component 130 may include a number of administrative tools. For example, the tool component 130 may include the vMotion component of VMware vCenter Server by VMware of Palo Alto, Calif., which is an advanced server management software that provides a centralized platform for controlling VMware vSphere environments and allows administrators to automate, deliver, and carry out VM migrations in a virtual infrastructure across the hybrid cloud. The tool 130 may also include other applications like Hybrid Cloud Extension (by VMware), which is designed to simplify tasks such as application migration, workload rebalancing, and business continuity across data centers and clouds.

In one or more embodiments, the placement system 105 comprising two principal sets of components: logic 110 and 115 for collecting data about one or more metrics related to a virtual desktop instance at a cloud deployment and memory 120 for storing information related to virtual desktop placement, which may include collected data. In the depicted embodiment, the metrics are related to latency 115 and cloud-specific process/functionality and corresponding correlations of functionality 110; although it shall be noted that other metrics may additional or alternatively be collected. In one or more embodiments, data about the metrics, such as functionality availability on a per-cloud basis, latency information, user requirements or conditions, and/or other data related to virtual desktop placement, may be stored in the data store 120.

In one or more embodiments, the application logic for process/functionality correlation 110 is used to gather data related to the correlation of functionalities used by users and available on various clouds. Method embodiments for collecting such data are described in more detail in Section B, below.

In one or more embodiments, the application logic for latency 115 is used to gather latency-related data. Method embodiments for collecting latency-related data are described in more detail in Section C, below.

The latency and functionality data collection processes may be background processes or may be executed by request. Also, one or more of these processes may be systemic or may operate on only a targeted set of one or more users.

B. Functionality Correlation Embodiments

As noted above, one of the criteria that may be considered when placing (whether initially or subsequently as part of a migration) a virtual desktop instance for a user is functionality requirements of the user. Because different cloud implementations offer different functionalities, correlating supported services/functions to users' requirements or usages may be an important consideration when deciding where to place a user's virtual desktop.

It is important to note that each cloud deployment (which may also be referred to as a cloud location) has its own set of virtual desktop functionality, which may vary significantly between cloud deployments. For example, desktops residing in a hyperscale public cloud location may not have particular User Environment Management (UEM) functionality due to the underlying architectural characteristics of that public cloud. Or, for example, functionality related to Linked Clone desktop pools and vTPM (trusted platform module) may vary cloud location to cloud location. There may be applications or features that require these pieces of functionality in order to operate. If a user needs or wants to use these applications or features, then it is important that their virtual desktop instances be located on clouds that provide the underlying functionality support.

Thus, in one or more embodiments, for each element of functionality that is available in specific cloud locations but not in others, the application logic for process correlation 110 monitors the virtual desktop instances that are running in the locations that have that functionality. By monitoring cloud locations with the functionality, the application logic for process correlation can assess whether there is a correlation between the usage of other functionality or activities and usage of the cloud-specific functionality.

Consider, by way of illustration, the following example. Assume that a specific cloud location or locations support or offer functionality that is not available in one or more other cloud locations. For convenience, this functionality shall be referred to as "functionality Y." For each element of functionality Y, the virtual desktop instances that are running in those cloud locations that have functionality Y are monitored to assess whether there is a correlation between the usage of other functionalities or activities (which may be referred to for convenience as "functionality X") and the usage of functionality Y. In one or more embodiments, this correlation may be detected by detecting correlation between processes that are associated with functionality Y and functionality X. In one or more embodiments, correlation is detected using a Pearson correlation method. In one or more embodiments, when this correlation is detected, virtual desktop instances running in locations that do not possess functionality Y are also monitored to detect whether the users are using functionality X. In one or more embodiments, the frequency of usage of functionality X may be monitored. In one or more embodiments, a stack-ranked list of virtual desktop users for placement/migration to another virtual desktop location is created.

Figure 2:
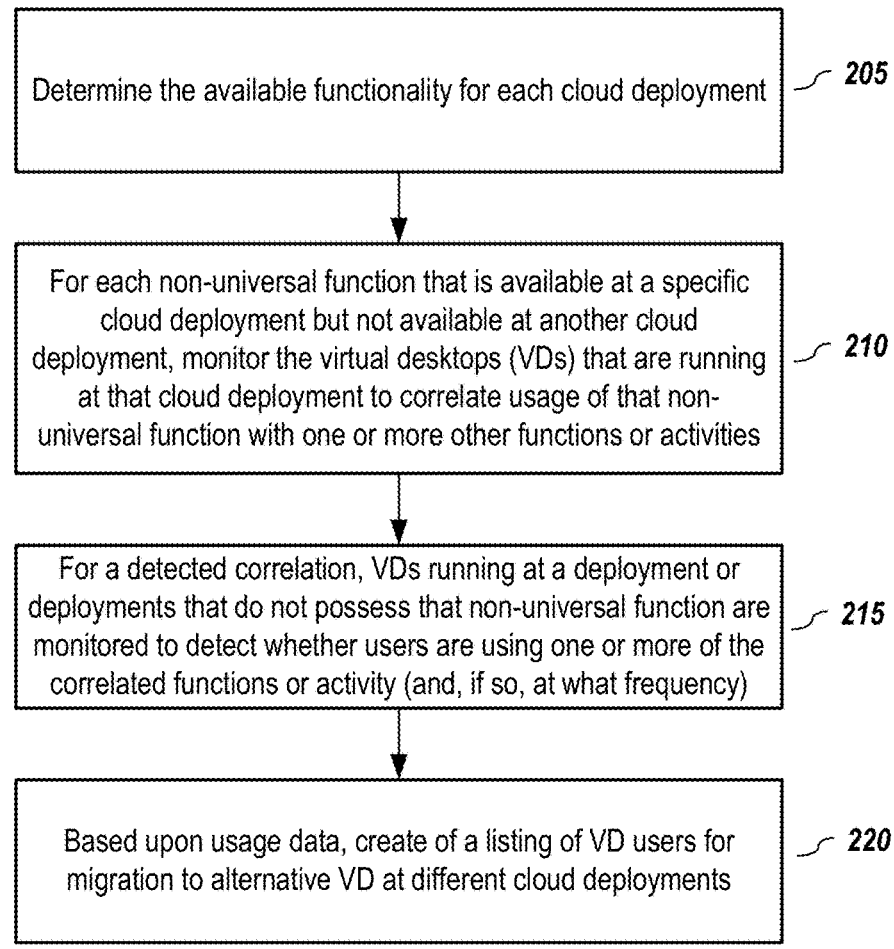
FIG. 2 depicts a method for determining user-to-cloud correlation based upon cloud functionality, according to embodiments of the present disclosure.

FIG. 2 depicts a method for determining user-to-cloud correlation based upon cloud functionality, according to embodiments of the present disclosure. In one or more embodiments, data is collected to determine (205) the available functionality for each cloud deployment. This information may be obtained from the cloud provider, from the suppliers of the underlying hardware and software components of the cloud deployment, via experience with the cloud deployment (e.g., monitored or collected data), or from a combination of thereof. Based upon the available functionality feature sets, there will be some functionalities that will be universal (i.e., available on all cloud deployments) and some functionalities that are not universal (i.e., available on a subset of one or more cloud deployments). It shall be noted that references to cloud deployments shall be considered to include different service levels at the same cloud location. For example, a base cloud subscription at cloud provider 1 and a premium cloud subscription also at cloud provider 1 may have different functionalities and shall be considered different cloud deployments or different cloud locations.

In one or more embodiments, for each non-universal function that is available at a specific cloud deployment but not available at another cloud deployment, the virtual desktops that are running at that cloud deployment are monitored (210) to correlate usage of that non-universal function with one or more other functions or activities. In one or more embodiments, for a detected correlation, virtual desktops running in a deployment or deployments that do not possess that non-universal function are monitored (215) to detect whether users are using one or more of the correlated functions or activity (and, if so, at what frequency). If significant usage of a correlated function (e.g., function X) is detected but the non-universal correlated function (e.g., function Y) is not available, a recommendation may be made to migrate the user to a location where that non-universal correlated function (i.e., function Y) is available. Based upon usage data, a ranked or prioritized list of virtual desktop users for placement or migration to alternative virtual desktop at different cloud deployments may be generated (220). In one or more embodiments, this information may be stored in a memory, such a data store 120, which may be used as one or more metrics when determining placement of a virtual desktop instance or instances.

By way of illustration and not limitation, consider the following example. Consider a piece of security software that utilizes vTPM. If there are one or more activities that lead up to the usage of the vTPM, these activities are likely be correlated to the vTPM functionality. Such activities might include actions such as the launch of security software. In a cloud location that has vTPM (Cloud Deployment 1), the user may: (i) launch the security software [activity X], and then (ii) perform an activity that calls up the vTPM, such as perform an encryption [activity Y]. The correlation between X and Y may be detected by a correlation methodology. Meanwhile, in a location that does not have vTPM (Cloud Deployment 2), there may still be frequent instances of the user performing activity X (i.e., running security software) but they cannot perform activity Y because the vTPM functionality is not present at Cloud Deployment 2. Thus, a correlation has been detected at Cloud Deployment 1 and a frequent execution of activity X has also be detected at Cloud Deployment 2 (activity Y is not available at Cloud Deployment 2 because vTPM is not available there). This information may be used to create a recommendation to migrate this user at Cloud Deployment 2 to a cloud deployment that possesses vTPM (e.g., Cloud Deployment 1). An example of such might be that a user selects a dialog box (function X) and wants to do perform function Y, which is accessed via the dialog box. But, if function Y is not available, that feature may be greyed out or otherwise not accessible.

Alternatively, or additionally, in one or more embodiments, verifications of correlation may be made. In one or more embodiments, if a potentially correlated functionality is used in cloud locations that do not support the corresponding correlated non-universal functionality, then it may be determined that there is not a correlation.

In one or more embodiments, the correlations may be at a cloud deployment level. For example, a generalized lookup table may comprise a listing of non-universal features and their correlated features that rely upon the non-universal features in order to function. For example, if an administrator is seeking to place a virtual desktop instance, and the administrator knows that functionality X will be needed based upon a user's requirements or conditions, the lookup table may be consulted to determine if a specific non-universal functionality or functionalities are needed to support functionality X. If a specific non-universal functionality or functionalities are needed to support functionality X, the administrator can consult the lookup table for a cloud deployment or deployments that offer that specific non-universal functionality or functionalities.

In one or more embodiments, the lookup table may be used for specific deployments and updated continuously or periodically. For example, in one or more embodiments, cloud locations are monitored to check if there are processes (e.g., function X) which are running in locations which have non-universal functions (e.g., function Y) which are correlated to that non-universal function. In one or more embodiments, the lookup table may be used for different purposes including: (i) periodic assessment of migration candidates, which may be part of an automated migration process; (ii) on-demand migration recommendations, which may be used in the case of manual administrator migration. Thus, in embodiments, the lookup data contains relevant migration for each of a set of monitored users and for the non-universal functionalities and correlated functionalities of the different cloud locations.

C. Latency Correlation Embodiments

In the placement of a virtual desktop instance, a latency criterion may be an important factor. In one or more embodiments, it is preferred to minimize end-to-end latency for users. In one or more embodiments, latency from the user endpoint to the virtual desktop and latency from the virtual desktop to the applications that it uses may both be considered. Modern operating systems and virtual desktop management environments allow the detection of endpoint device location, cloud virtual desktop location, and cloud application location. For example, mechanisms, such as Application Programming Interfaces (API) calls, Power-Shell, and the like, combined with constructs or technologies such as Active Directory sites and GPS information, may be used to obtain location information. Using this information, it is possible to calculate the virtual desktop location, which may be used to help minimize end-to-end latency. Alternatively, or additionally, network traffic may be monitored to compile statistics related to latency for particular virtual desktop instances and for particular applications or types of network traffic.

Figure 3:
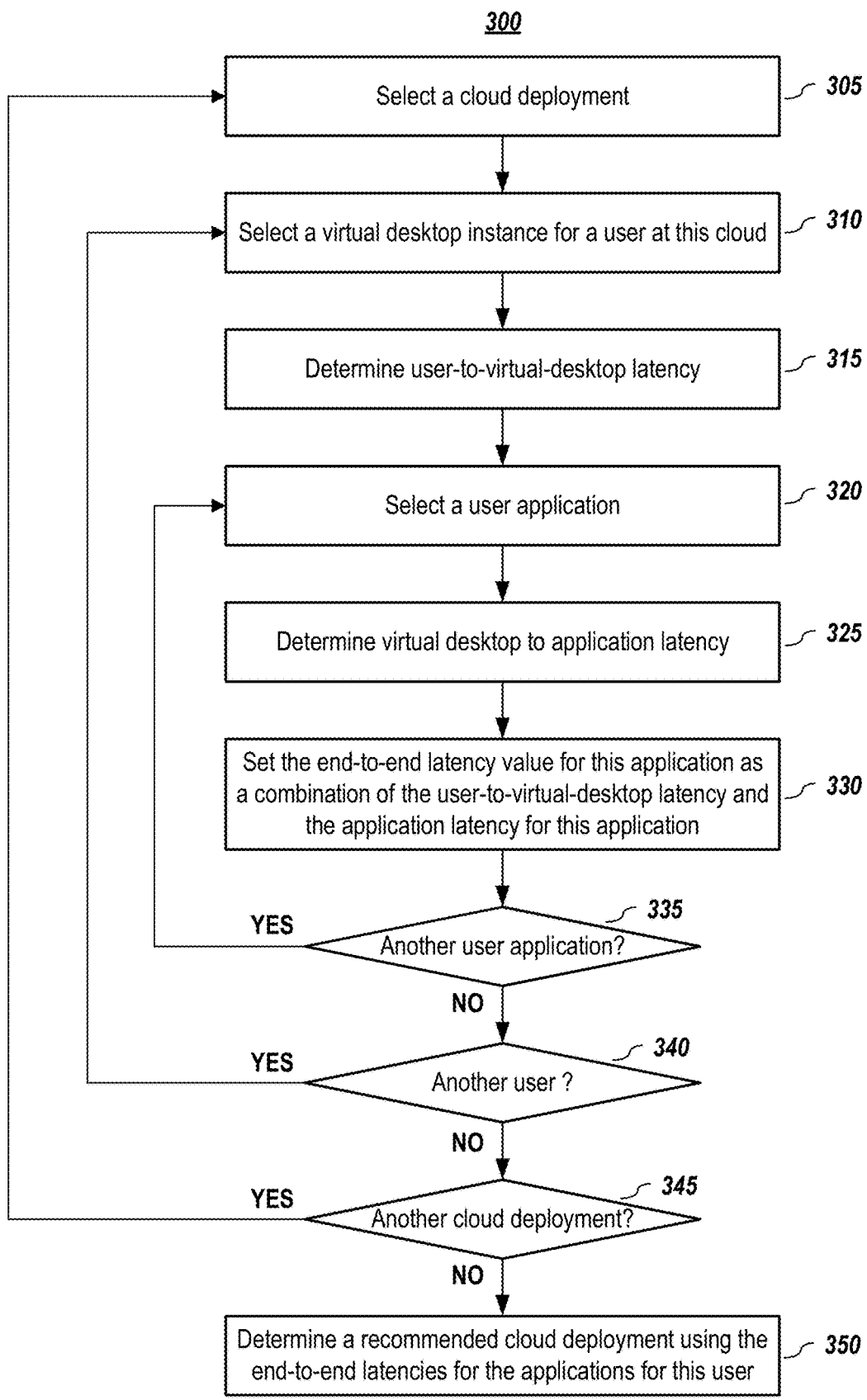
FIG. 3 depicts a method for determining user-to-cloud correlation based upon latency, according to embodiments of the present disclosure.

FIG. 3 depicts a method for determining user-to-cloud correlation based upon latency, according to embodiments of the present disclosure. As depicted, in one or more embodiments, the methodology commences by selecting (305) a specific cloud deployment. In one or more embodiments, a user at that cloud deployment is then selected (310) and the user-to-virtual-desktop latency is determined (315). Given that the user is accessing the virtual desktop instance at the cloud deployment from a remote location, some latency will exist between the user and the virtual desktop instance, which can be determined by examining the latency between the user and the cloud deployment.

In one or more embodiments, the latency determination may be made at an application level to provide further granularity in making latency-related decisions about virtual desktop placement. Thus, a user application for the selected user may be selected (320) and the application-specific latency determined (325). In one or more embodiments, the end-to-end latency for this application may be set (330) as a combination of the user-to-virtual-desktop latency and the application latency for this application, which information may be stored for later reference when placing a virtual desktop for the user. As indicated in FIG. 3, this process may be repeated (335) for another application.

If there are no other applications for latency analysis for this user, the methodology may return (340) to step 310 to select another user at the cloud location for latency analysis, in which steps 310 through 330 are repeated.

Once all users at that cloud location have undergone latency analysis, the analysis may return (345) to step 305 to select another cloud deployment may be selected, and the entire process is repeated for the newly selected cloud deployment (i.e., steps 310-345).

If there are no other cloud deployments to be analyzed for latency, at least one or more pieces of latency data may be used to determine (350) a recommended cloud deployment.

D. Placement Method Embodiments

In one or more embodiments, metrics related to at least one of the two criteria referenced above—process correlation and latency—may be used in determining where to place a user's virtual desktop.

Figure 4:
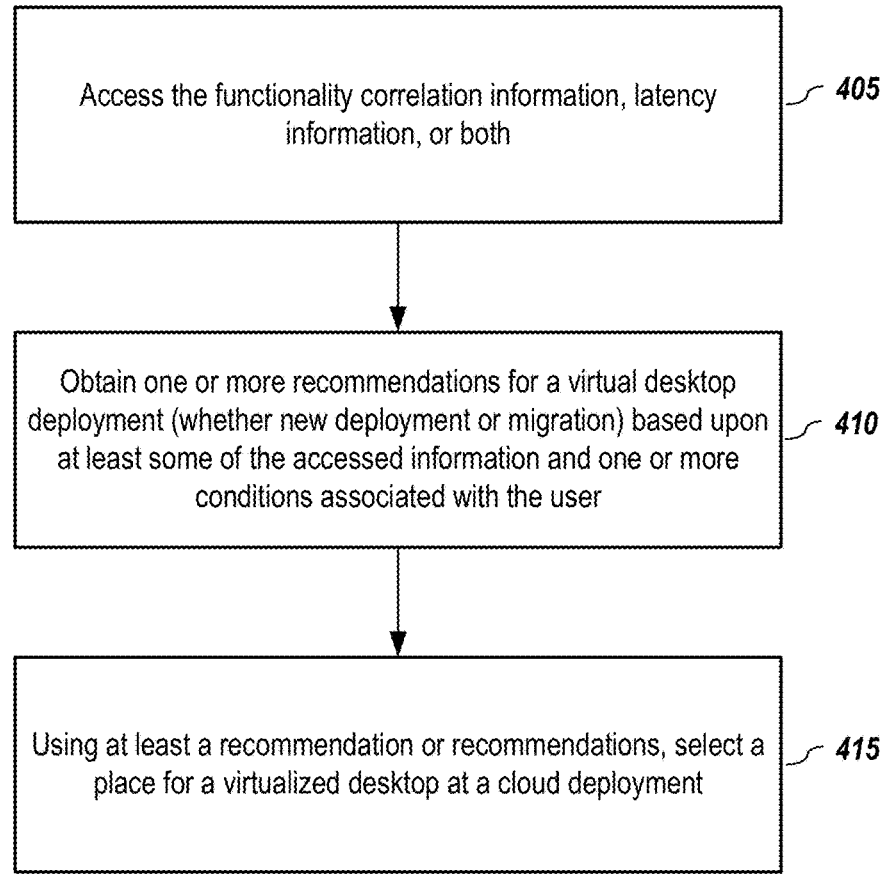
FIG. 4 depicts a method for determining a user's virtual desktop placement, whether initial placement or migration, according to embodiments of the present disclosure.

FIG. 4 depicts a method for determining a user's virtual desktop placement, whether initial placement or migration, according to embodiments of the present disclosure. As shown in the depicted embodiment, the functionality correlation information, the latency information, or both are accessed (405) to obtain data to be used in making one or more recommendations for a virtual desktop placement. In one or more embodiments, the data may be accessed by querying a data store, such as data store 120. Given a user's requirements or conditions (which also may be stored at the data store) and at some of the accessed data, a recommendation or recommendations may be generated (410). In one or more embodiments, a user's requirements or conditions and at some of the accessed data may be applied to one or more rules to obtain a recommendation, which also may be stored at the data store. In one or more embodiments, a rule or rules may be user specific.

In one or more embodiments, the recommendation or recommendations may be obtained programmatically to obtain a recommendation score or value, in which a user's requirements or conditions and at least part of the accessed data are applied to one or more rules or policies to obtain the recommendation score(s). Given the score values, the set of recommendation may be ranked by recommendation score value. Alternatively, or additionally to programmatically obtaining the recommendation, an administrator may use the information, conditions, one or more rules to obtain recommendations, and/or recommendation scores to set recommendations, filter recommendations, or alter recommendations.

In one or more embodiments, in determining a recommendation, one or more of the various factors/metrics may be weighted. For example, depending upon the importance for the user of latency for a certain application or applications, the corresponding latency values may be weighted higher or lower. In one or more embodiments, the weighting may be correlated to usage. Also, for example, functionality that is used frequently by a user may be highly weighted; similarly, functionality that is used infrequently or not at all by a user may be weighted with low values or disregarded (e.g., given a zero weight). It should be noted that the weighting may comprises multiple weightings. For example, an overall latency for a virtual desktop instance may be a weighted combination of latency for applications that are weighted by usage, and then the overall latency may be weighted in a combination with importance of functionality per cloud deployment to a user.

Having applied the data to the rules or policies, a set of recommendations may be obtained, and a top recommendation may be selected (415) for deployment of a virtual desktop instance for a user.

In one or more embodiments, in situations in which a number of users are being considered for placement, the users may also be ranked or prioritized. As a result, the placement of a virtual desktop for a user may not be the top recommendation if another user has a higher priority. For example, if a specific cloud deployment can accept only one more virtual desktop installation but that cloud deployment represents a top recommendation for two users, a user with a higher priority may be assigned to that cloud deployment and the other user's virtual desktop instance is placed the next highest recommendation at a different cloud deployment for that user. Alternatively, or additionally, one or more metrics may be set as a tiebreaker between users. For example, if the recommendation scores for two users are equal and one does not outrank the other, it may be that comparison of individual functionality or latency values may be used as a tiebreaker in the placement.

E. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), tablet, phablet, smart phone, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 5:
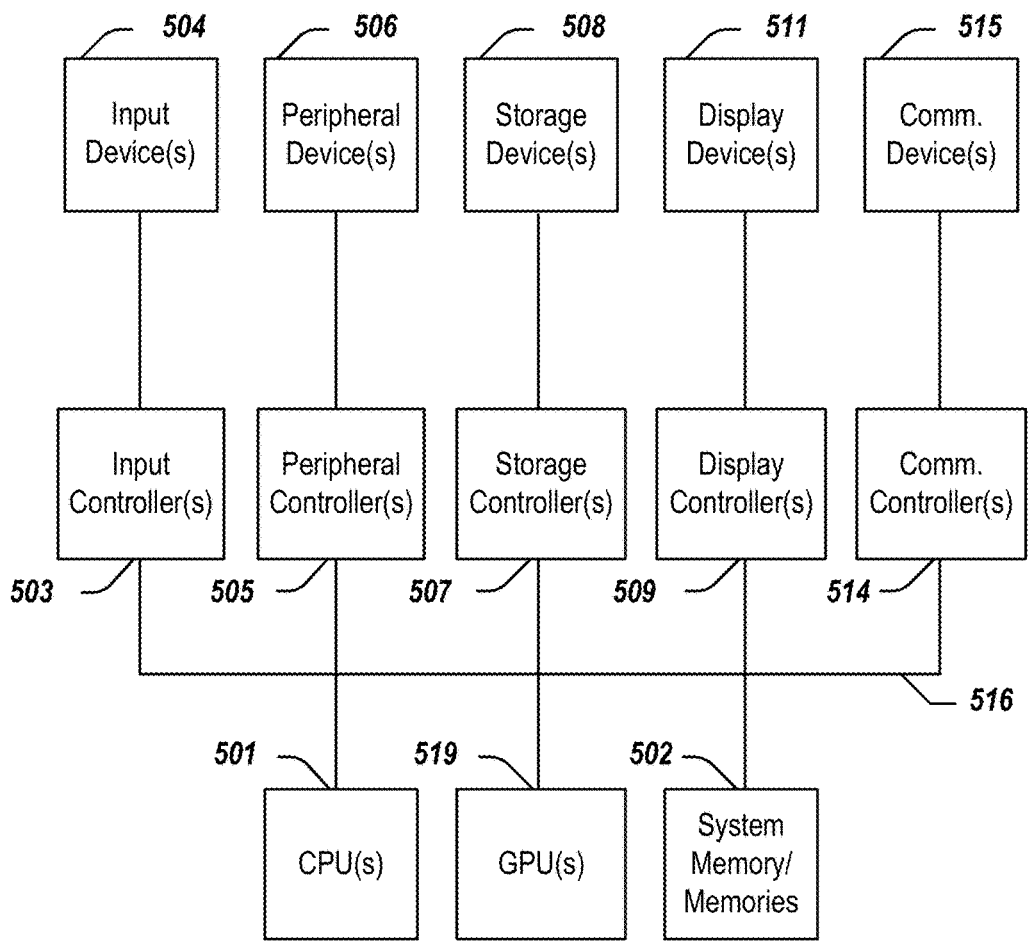
FIG. 5 depicts a simplified block diagram of an information handling system according to embodiments of the present invention.

FIG. 5 depicts a simplified block diagram of an information handling system (or computing system) according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like, and may also include one or more graphics processing units (GPU) 519 and/or a floating-point coprocessor for mathematical computations. In one or more embodiments, one or more GPUs may be incorporated within the display controller 509, such as part of a graphics card or cards. The system 500 may also include a system memory 502, which may include RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 6:
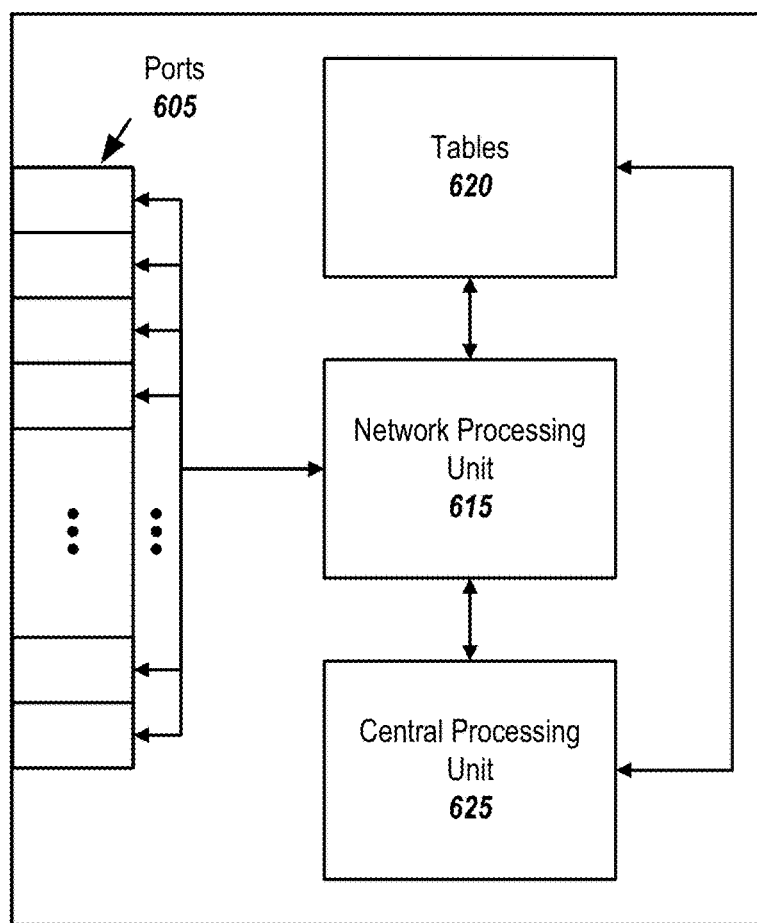
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
for each cloud deployment of a plurality of cloud deployments, obtaining data about one or more metrics related to a virtual desktop instance instantiated at the cloud deployment;
using at least a portion of the data about one or more metrics related to a virtual desktop instance at the cloud deployment and one or more conditions associated with a user to obtain a ranked set of recommendations for cloud deployments for placing a virtual desktop instance for the user;

selecting a cloud deployment for placing the virtual desktop instance for the user from the ranked set of recommendations; and installing a virtual desktop instance at the selected cloud deployment.

2. The computer-implemented method of claim 1 wherein the step of obtaining data about one or more metrics related to a virtual desktop instance at the cloud deployment comprises obtaining functionality correlation data related to the cloud deployment, latency data for a virtual desktop instance at the cloud deployment, or both.

3. The computer-implemented method of claim 2 wherein the step of obtaining functionality correlation data related to the cloud deployment comprises:

for each cloud deployment of the plurality of cloud deployments, obtaining functionality that is available for the cloud deployment;

for each non-universal function that is available at a cloud deployment but not available at another cloud deployment, monitoring one or more virtual desktop instances that are running at that cloud deployment to correlate usage of that non-universal function with one or more other functions or activities;

for a detected function correlated to the non-universal function, monitoring one or more virtual desktop instances running at one or more cloud deployments that do not possess the non-universal function to detect usage frequency of the detected function; and setting one or more metrics corresponding to the detected function related to correlation with one or more cloud deployments that possess the non-universal function.

4. The computer-implemented method of claim 2 wherein the step of obtaining latency data comprises:

[a] selecting a cloud deployment;

[b] selecting a virtual desktop instance for a user that at the selected cloud deployment;

[c] determining a user-to-virtual-desktop latency value for the user that at the selected cloud deployment;

[d] selecting an application supported by the selected virtual desktop instance for the user that at the selected cloud deployment;

[e] determining an application latency for the selected application; and

[f] setting an end-to-end latency value for the selected application as a combination of the user-to-virtual-desktop latency value and the application latency for the selected application.

5. The computer-implemented method of claim 4 further comprising:

responsive to selecting another application, repeating steps [e] and [f] for the another selected application;

responsive to selecting another virtual desktop instance for another user, repeating steps [c] through [f] for the another virtual desktop instance for the another user; and responsive to selecting another cloud deployment, repeating steps [b] through [f].

6. The computer-implemented method of claim 1 wherein the step of using at least a portion of the data about one or more metrics related to a virtual desktop instance at the cloud deployment and one or more conditions associated with a user to obtain a ranked set of recommendations for cloud deployments for placing a virtual desktop instance for the user comprises:

applying one or more rules that use at least a portion of the data about one or more metrics and at least one condition of the one or more conditions associated with the user to obtain a recommendation score.

7. The computer-implemented method of claim 1 wherein the one or more conditions associated with a user comprise user usage information, a user priority relative to at least one or more other users, or both.

8. A non-transitory computer-readable medium or media comprising one or more sequences of instructions which, when executed by at least one processor, causes steps to be performed comprising:

for each cloud deployment of a plurality of cloud deployments, obtaining data about one or more metrics related to a virtual desktop instance deployed at the cloud deployment;

using at least a portion of the data about one or more metrics related to a virtual desktop instance at the cloud deployment and one or more conditions associated with a user to obtain a ranked set of recommendations for cloud deployments for placing a virtual desktop instance for the user;

selecting a cloud deployment for placing the virtual desktop instance for the user from the ranked set of recommendations; and installing a virtual desktop instance at the selected cloud deployment.

9. The non-transitory computer-readable medium or media of claim 8 wherein the step of obtaining data about one or more metrics related to a virtual desktop instance at the cloud deployment comprises obtaining functionality correlation data related to the cloud deployment, latency data for a virtual desktop instance at the cloud deployment, or both.

10. The non-transitory computer-readable medium or media of claim 9 wherein the step of obtaining functionality correlation data related to the cloud deployment comprises:

for each cloud deployment of the plurality of cloud deployments, obtaining functionality that is available for the cloud deployment;

for each non-universal function that is available at a cloud deployment but not available at another cloud deployment, monitoring one or more virtual desktop instances that are running at that cloud deployment to correlate usage of that non-universal function with one or more other functions or activities;

for a detected function correlated to the non-universal function, monitoring one or more virtual desktop instances running at one or more cloud deployments that do not possess the non-universal function to detect usage frequency of the detected function; and setting one or more metrics corresponding to the detected function related to correlation with one or more cloud deployments that possess the non-universal function.

11. The non-transitory computer-readable medium or media of claim 9 wherein the step of obtaining latency data comprises:

[a] selecting a cloud deployment;

[b] selecting a virtual desktop instance for a user that at the selected cloud deployment;

[c] determining a user-to-virtual-desktop latency value for the user that at the selected cloud deployment;

[d] selecting an application supported by the selected virtual desktop instance for the user that at the selected cloud deployment;
[e] determining an application latency for the selected application; and
[f] setting an end-to-end latency value for the selected application as a combination of the user-to-virtual-desktop latency value and the application latency for the selected application.

12. The non-transitory computer-readable medium or media of claim 11 further comprising:
responsive to selecting another application, repeating steps [e] and [f] for the another selected application;
responsive to selecting another virtual desktop instance for another user, repeating steps [c] through [f] for the another virtual desktop instance for the another user; and
responsive to selecting another cloud deployment, repeating steps [b] through [f].

13. The non-transitory computer-readable medium or media of claim 8 wherein the step of using at least a portion of the data about one or more metrics related to a virtual desktop instance at the cloud deployment and one or more conditions associated with a user to obtain a ranked set of recommendations for cloud deployments for placing a virtual desktop instance for the user comprises:
applying one or more rules that use at least a portion of the data about one or more metrics and at least one condition of the one or more conditions associated with the user to obtain a recommendation score.

14. An information handling system comprising:
one or more processors; and
a non-transitory computer-readable medium or media comprising one or more sets of instructions which, when executed by at least one of the one or more processors, causes steps to be performed comprising:
for each cloud deployment of a plurality of cloud deployments, obtaining data about one or more metrics related to a virtual desktop instance instantiated at the cloud deployment;
using at least a portion of the data about one or more metrics related to a virtual desktop instance at the cloud deployment and one or more conditions associated with a user to obtain a ranked set of recommendations for cloud deployments for placing a virtual desktop instance for the user;
selecting a cloud deployment for placing the virtual desktop instance for the user from the ranked set of recommendations; and
installing a virtual desktop instance at the selected cloud deployment.

15. The information handling system of claim 14 wherein the step of obtaining data about one or more metrics related to a virtual desktop instance at the cloud deployment comprises obtaining functionality correlation data related to the cloud deployment, latency data for a virtual desktop instance at the cloud deployment, or both.

16. The information handling system of claim 15 wherein the step of obtaining functionality correlation data related to the cloud deployment comprises:
for each cloud deployment of the plurality of cloud deployments, obtaining functionality that is available for the cloud deployment;
for each non-universal function that is available at a cloud deployment but not available at another cloud deployment, monitoring one or more virtual desktop instances that are running at that cloud deployment to correlate usage of that non-universal function with one or more other functions or activities;
for a detected function correlated to the non-universal function, monitoring one or more virtual desktop instances running at one or more cloud deployments that do not possess the non-universal function to detect usage frequency of the detected function; and
setting one or more metrics corresponding to the detected function related to correlation with one or more cloud deployments that possess the non-universal function.

17. The information handling system of claim 15 wherein the step of obtaining latency data comprises:
[a] selecting a cloud deployment;
[b] selecting a virtual desktop instance for a user that at the selected cloud deployment;
[c] determining a user-to-virtual-desktop latency value for the user that at the selected cloud deployment;
[d] selecting an application supported by the selected virtual desktop instance for the user that at the selected cloud deployment;
[e] determining an application latency for the selected application; and
[f] setting an end-to-end latency value for the selected application as a combination of the user-to-virtual-desktop latency value and the application latency for the selected application.

18. The information handling system of claim 17 wherein the non-transitory computer-readable medium or media further comprises one or more sets of instructions which, when executed by at least one of the one or more processors, causes steps to be performed comprising:
responsive to selecting another application, repeating steps [e] and [f] for the another selected application;
responsive to selecting another virtual desktop instance for another user, repeating steps [c] through [f] for the another virtual desktop instance for the another user; and
responsive to selecting another cloud deployment, repeating steps [b] through [f].

19. The information handling system of claim 14 wherein the step of using at least a portion of the data about one or more metrics related to a virtual desktop instance at the cloud deployment and one or more conditions associated with a user to obtain a ranked set of recommendations for cloud deployments for placing a virtual desktop instance for the user comprises:
applying one or more rules that use at least a portion of the data about one or more metrics and at least one condition of the one or more conditions associated with the user to obtain a recommendation score.

20. The information handling system of claim 14 wherein the one or more conditions associated with a user comprise user usage information, a user priority relative to at least one or more other users, or both.

21. A computer-implemented method comprising:
for each cloud deployment of a plurality of cloud deployments, obtaining data about one or more metrics related to a virtual desktop instance at the cloud deployment, which comprises obtaining functionality correlation data related to the cloud deployment by performing steps comprising:
for a cloud deployment from the plurality of cloud deployments, obtaining functionality that is available for the cloud deployment;
for a non-universal function that is available at a cloud deployment but not available at another cloud deployment, monitoring one or more virtual desktop instances that are running at that cloud deployment to correlate usage of that non-universal function with one or more other functions or activities;

for a detected function correlated to the non-universal function, monitoring one or more virtual desktop instances running at one or more cloud deployments that do not possess the non-universal function to detect usage frequency of the detected function; and setting one or more metrics corresponding to the detected function related to one or more cloud deployments that possess the non-universal function;

using at least a portion of the data about one or more metrics related to a virtual desktop instance at the cloud deployment and one or more conditions associated with a user to obtain a ranked set of recommendations for cloud deployments for placing a virtual desktop instance for the user;

selecting a cloud deployment for placing the virtual desktop instance for the user from the ranked set of recommendations; and installing a virtual desktop instance at the selected cloud deployment.

* * * * *